US009204008B2

(12) United States Patent  (10) Patent No.: US 9,204,008 B2
Kuroda  (45) Date of Patent: Dec. 1, 2015

(54) IMAGE FORMING APPARATUS

(71) Applicant: KYOCERA Document Solutions Inc., Osaka-shi, Osaka (JP)

(72) Inventor: Koji Kuroda, Osaka (JP)

(73) Assignee: KYOCERA Document Solutions Inc. (JP)

(*) Notice: Subject to any disclaimer, the term of this patent is extended or adjusted under 35 U.S.C. 154(b) by 61 days.

(21) Appl. No.: 14/190,815

(22) Filed: Feb. 26, 2014

(65) Prior Publication Data

US 2014/0240722 A1    Aug. 28, 2014

(30) Foreign Application Priority Data

Feb. 27, 2013 (JP) ................................. 2013-037502

(51) Int. Cl.
*H04N 1/387* (2006.01)
*G06F 3/12* (2006.01)
*G06K 15/02* (2006.01)

(52) U.S. Cl.
CPC .............. *H04N 1/387* (2013.01); *G06F 3/1258* (2013.01); *G06K 15/1807* (2013.01); *H04N 1/3875* (2013.01); *G06F 3/1219* (2013.01); *G06K 15/1825* (2013.01)

(58) Field of Classification Search
None
See application file for complete search history.

(56) References Cited

U.S. PATENT DOCUMENTS

| | | | |
|---|---|---|---|
| 2008/0170262 A1* | 7/2008 | Takahashi | 358/1.15 |
| 2009/0279108 A1 | 11/2009 | Hoshi et al. | |
| 2012/0274975 A1* | 11/2012 | Uemura | 358/1.14 |
| 2013/0278970 A1 | 10/2013 | Hoshi et al. | |

FOREIGN PATENT DOCUMENTS

| | | |
|---|---|---|
| JP | 2005-348205 | 12/2005 |
| JP | 2006-256162 | 9/2006 |
| JP | 2009-278198 | 11/2009 |
| JP | 2012-060234 | 3/2012 |

OTHER PUBLICATIONS

JP2005236804—translation, Miyamoto et al, Sep. 2, 2005.*
Japanese Patent Appl. No. 2013-037502—Office Action issued Apr. 14, 2015.

* cited by examiner

*Primary Examiner* — Fan Zhang
(74) *Attorney, Agent, or Firm* — Gerald E. Hespos; Michael J. Porco; Matthew T. Hespos

(57) ABSTRACT

An image forming apparatus includes an image forming unit, an image receiving unit, an aggregate printing process unit, a size receiving unit, a size judgment unit, and an aggregate sheet number determination unit. In the case where the size judgment unit judges that an aggregate printing process is executable in such a manner that the smallest size (aggregate smallest size) of characters included in an aggregate print image formed on a sheet by the aggregate printing process is not smaller than the lower limit value (lower limit size) of the size of characters included in the aggregate print image received by the size receiving unit, the aggregate sheet number determination unit determines the aggregate sheet number in such a manner that the aggregate smallest size is not smaller than the lower limit size, and the aggregate printing process unit executes the aggregate printing process using the aggregate sheet number.

3 Claims, 9 Drawing Sheets

| AGGREGATE SHEET NUMBER | REDUCTION RATIO | CHARACTER SIZE CONDITION 10 POINTS→4 POINTS OR LARGER | CHARACTER SIZE CONDITION 10 POINTS→8 POINTS OR LARGER |
|---|---|---|---|
| 2 | 71% | ○ (7pt) | × (7pt) |
| 4 | 50% | ○ (5pt) | × (5pt) |
| 8 | 35% | × (3.5pt) | × (3.5pt) |

| AGGREGATE SHEET NUMBER | SHEET NUMBER CONDITION 10 SHEETS→3 SHEETS OR LESS | SHEET NUMBER CONDITION 10 SHEETS→2 SHEETS OR LESS |
|---|---|---|
| 2 | × (5 SHEETS) | × (5 SHEETS) |
| 4 | ○ (3 SHEETS) | × (3 SHEETS) |
| 8 | ○ (2 SHEETS) | ○ (2 SHEETS) | ically to a technology of aggregating
IMAGE FORMING APPARATUS

This application is based on Japanese Patent Application No. 2013-037502 filed on Feb. 27, 2013, the contents of which are hereby incorporated by reference.

BACKGROUND

The present disclosure relates to an image forming apparatus, and more particularly to a technology of aggregating and printing a plurality of images on one sheet.

Conventionally, there is known an image forming apparatus provided with a function of aggregating and printing a plurality of images on one sheet. For instance, there is known, as such an image forming apparatus, an MFP (Multi Function Peripheral) configured to perform Nin1 printing of printing a plurality of materials on one sheet of paper. The MFP allows the user to select an intended layout, out of the layouts of Nin1 such as 2in1 (two-in-one) layout and 4in1 (four-in-one) layout before the user performs Nin1 printing. The MFP is configured to generate an image representing a layout result corresponding to one page, based on each of the layouts with respect to each of the selected layouts. The MFP test-prints the generated images of the number equal to the number of the selected layouts on one sheet. Further, the MFP allows the user to designate a smallest size of characters after the Nin1 printing, and controls so that the character size after the printing is larger than the designated character size.

In the MFP, the user may designate a character size larger than the document character size, as the character size after aggregate printing. In this case, the MFP enlarges a printed image in order to make the character size after aggregate printing larger than the designated character size. Conceivably, however, the user does not intend to enlarge the image in performing aggregate printing. In other words, in this case, it is highly likely that the user may erroneously designate the character size. In the case where aggregate printing is performed based on an erroneously designated character size, the user fails to obtain an intended print result. As a result, the user has to perform aggregate printing again by designating the character size again. Further, sheets or toner may be wasted by repeating aggregate printing.

An object of the present disclosure is to efficiently perform aggregate printing as intended by the user.

SUMMARY

An image forming apparatus according to an aspect of the present disclosure includes an image forming unit, an image receiving unit, an aggregate printing process unit, a size receiving unit, a size judgment unit, and an aggregate sheet number determination unit. The image forming unit is configured to form an image on a sheet. The image receiving unit is configured to receive the image including characters. The aggregate printing process unit is configured to execute an aggregate printing process of aggregating received character images received by the image receiving unit and causing the image forming unit to form an aggregate print image on one of sheets. The size receiving unit is configured to receive a lower limit value of a size of characters included in the aggregate print image to be formed on the sheet by the aggregate printing process. The size judgment unit is configured to judge that the aggregate printing process is executable, in the case where the aggregate printing process is executable in such a manner that an aggregate smallest size is not smaller than a lower limit size, the aggregate smallest size being a smallest size of the characters included in the aggregate print image, the lower limit size being the lower limit value of the size of characters received by the size receiving unit. The aggregate sheet number determination unit is configured to execute an aggregate sheet number determination process of determining an aggregate sheet number in such a manner that the aggregate smallest size is not smaller than the lower limit size, in the case where the size judgment unit judges that the aggregate printing process is executable, the aggregate sheet number being the number of sheets of images to be aggregated on one of sheets by the aggregate printing process. The aggregate printing process unit executes the aggregate printing process using the aggregate sheet number determined by the aggregate sheet number determination unit, in the case where the size judgment unit judges that the aggregate printing process is executable.

These and other objects, features and advantages of the present disclosure will become more apparent upon reading the following detailed description along with the accompanying drawings.

DETAILED DESCRIPTION

Figure 1:
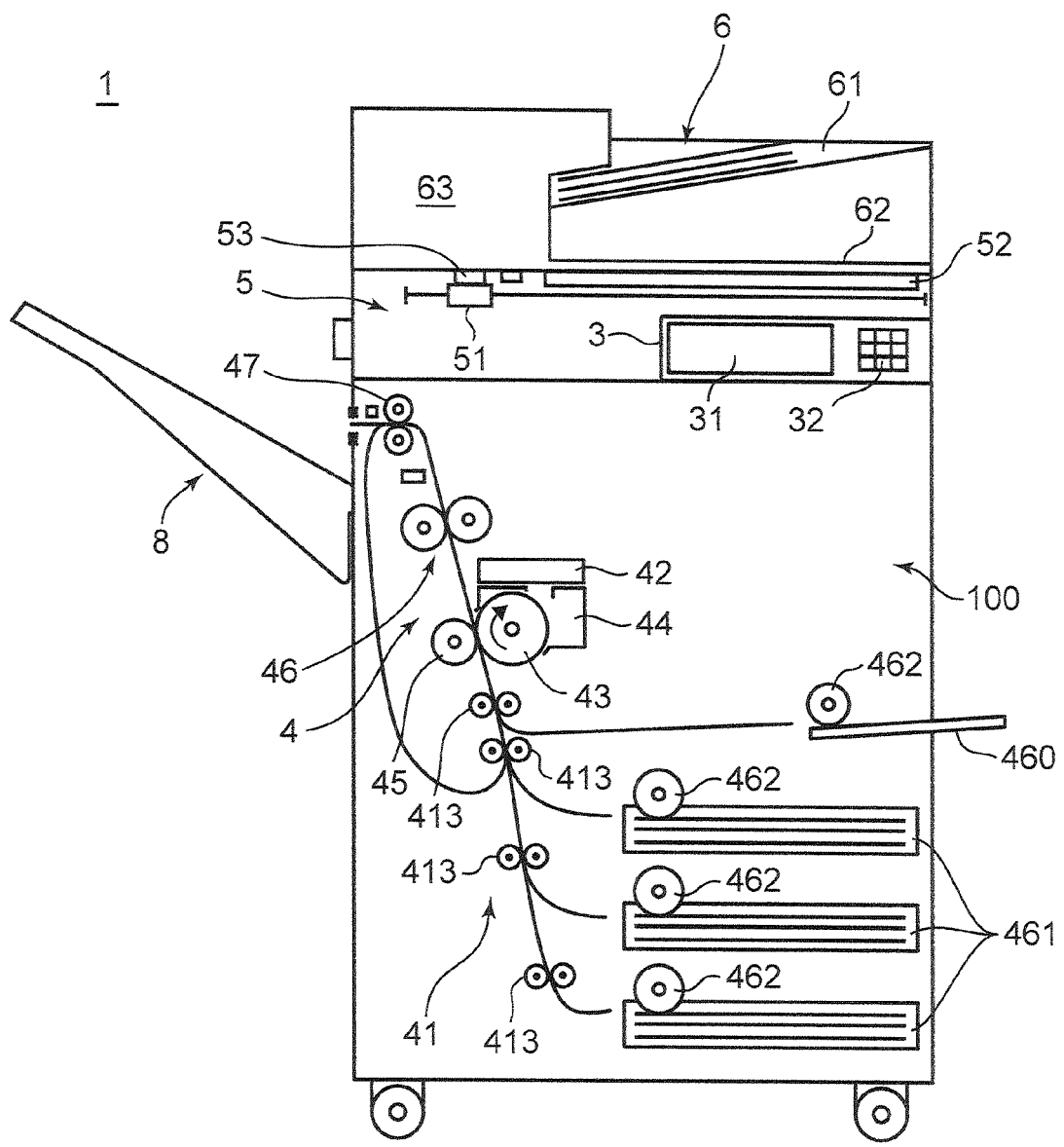
FIG. 1 is a schematic structure diagram of a complex machine as an example of an image forming apparatus embodying the present disclosure.
Figure 2:
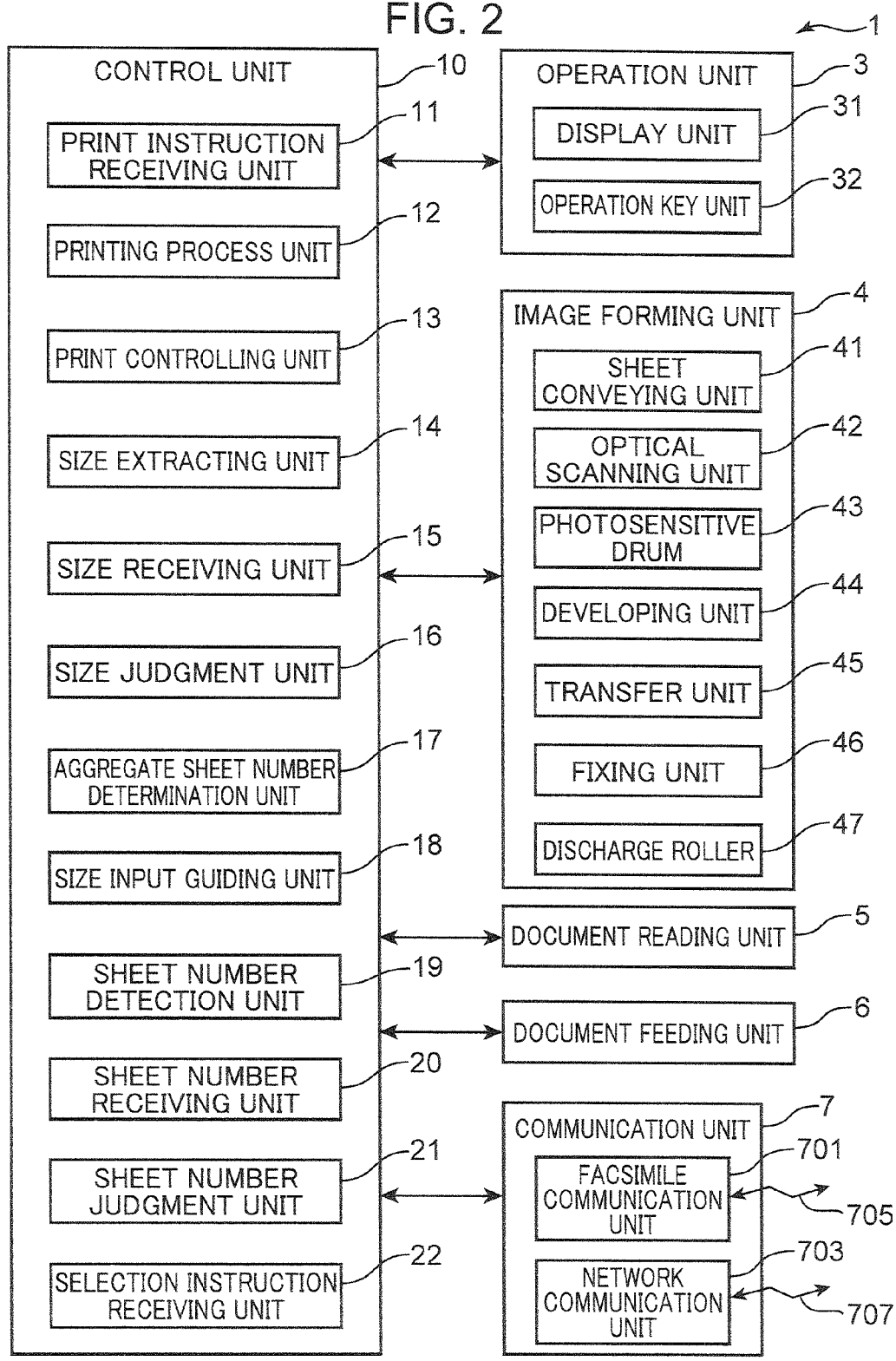
FIG. 2 is a block diagram illustrating an electrical configuration of the complex machine.

In the following, an embodiment of the present disclosure is described in detail referring to the drawings. FIG. 1 is a schematic structure diagram of a complex machine 1 as an example of an image forming apparatus embodying the present disclosure. FIG. 2 is a block diagram illustrating an electrical configuration of the complex machine 1. As illustrated in FIG. 1, the complex machine 1 is provided with an operation unit 3, a document reading unit 5, a document feeding unit 6, and a main body unit 100.

The operation unit 3 is provided with a display unit 31 configured to display information, and an operation key unit 32 configured to allow the user to perform various operation instructions. The display unit 31 is constituted of a liquid crystal display having a touch panel function, for instance. The operation key unit 32 is provided with various keys such as hard keys, a start key, and a numeric keypad. The hard keys are provided for allowing the user to switch an operation function between the functions provided in the complex machine 1 such as a copy function and a facsimile function. The start key is provided for allowing the user to input start of an operation of the respective functions. The numeric keypad is provided for allowing the user to input the numerical values such as the number of copies to be printed, a smallest character size in an aggregate printing process to be described later, and the number of sheets to be output in the aggregate printing process to be described later.

The document reading unit 5 (an image receiving unit) is provided with a scanner unit 51 constituted of an exposure lamp and a CCD (Charge Coupled Device), a document platen 52 constituted of a transparent member such as glass, and a document reading slit 53.

The scanner unit 51 is configured to be movable by an unillustrated driving unit. The scanner unit 51 is moved along a document plane at a position facing the document platen 52 when a document set on the document platen 52 is read. The scanner unit 51 is configured to acquire (receive) image data representing an image of a document while scanning the document. The scanner unit 51 is configured to move to a position facing the document reading slit 53 when a document fed by the document feeding unit 6 is read. The scanner unit 51 is configured to acquire (receive) image data representing a document image through the document reading slit 53 synchronously with a document feeding operation to be performed by the document feeding unit 6.

The document feeding unit 6 is provided with a document setting portion 61 configured to set a document, a document discharging portion 62 configured to discharge a document after image reading, and a document conveying mechanism 63. The document conveying mechanism 63 is configured to convey the documents set on the document setting portion 61 one by one to the position facing the document reading slit 63, and to discharge the documents onto the document discharging portion 62.

The main body unit 100 is provided with a manual tray 460, sheet cassettes 461, sheet feeding rollers 462, an image forming unit 4, and a discharge tray 8.

The sheet feeding rollers 462 are configured to dispense the sheets placed on the manual tray 460 or the sheets accommodated in the sheet cassettes 461 one by one, and to feed the sheets to the image forming unit 4.

The image forming unit 4 is provided with a sheet conveying unit 41, an optical scanning unit 42, a photosensitive drum 43, a developing unit 44, a transfer unit 45, a fixing unit 46, and a discharge roller 47.

The sheet conveying unit 41 is provided in a sheet conveyance path in the image forming unit 4. The sheet conveying unit 41 is provided with conveyance rollers 413. Each of the conveyance rollers 413 supplies a sheet fed by each of the sheet feeding rollers 462 to the photosensitive drum 43.

The optical scanning unit 42 is configured to output laser light based on image data inputted to a control unit 10 under the control of the control unit 10. The optical scanning unit 42 is configured to form an electrostatic latent image on the photosensitive drum 43 by scanning the photosensitive drum 43 with the output laser light.

The developing unit 44 is configured to form a toner image by adhering toner to the electrostatic latent image on the photosensitive drum 43. The transfer unit 45 is configured to transfer the toner image on the photosensitive drum 43 onto a sheet. The fixing unit 46 is configured to fix the toner image onto the sheet by applying heat to the sheet carrying the transferred toner image.

The discharge roller 47 is configured to discharge a sheet having an image formed thereon by the image forming unit 4 onto the discharge tray 8.

As illustrated in FIG. 2, the complex machine 1 is further provided with a communication unit 7 (an image receiving unit), and the control unit 10.

The communication unit 7 is provided with a facsimile communication unit 701 and a network communication unit 703. The facsimile communication unit 701 is provided with an NCU (Network Control Unit) configured to control connection of a telephone line to a destination facsimile machine, and a modulation/demodulation circuit configured to modulate and demodulate a signal such as an image signal for facsimile communications. The facsimile communication unit 701 is configured to receive an image signal output from the facsimile machine connected to a telephone line network 705. The facsimile communication unit 701 is configured to acquire (receive) image data representing an image to be printed in a facsimile function, for instance, by demodulating the received image signal.

The network communication unit 703 is connected to a LAN (Local Area Network) 707. The network communication unit 703 is a communication interface circuit configured to perform communications with an external device such as a personal computer, which is connected to the LAN 707. The network communication unit 703 is configured to receive an execution instruction of a printer function output from the external device, or receive image data representing an image to be printed in a printer function, for instance.

The control unit 10 is configured to control overall operations of the complex machine 1. The control unit 10 is provided with a CPU (Central Processing Unit) configured to execute a predetermined arithmetic process, a non-volatile memory such as an EEPROM (Electrically Erasable and Programmable Read Only Memory) configured to store a predetermined control program, a RAM (Random Access Memory) configured to temporarily store data, and peripheral circuits thereof.

The control unit 10 constitutes a print instruction receiving unit 11, a printing process unit 12 (an aggregate printing process unit), a print controlling unit 13, a size extracting unit 14, a size receiving unit 15, a size judgment unit 16, an aggregate sheet number determination unit 17, a size input guiding unit 18, a sheet number detection unit 19, a sheet number receiving unit 20, a sheet number judgment unit 21, and a selection instruction receiving unit 22 by executing the control program stored in the non-volatile memory.

The print instruction receiving unit 11 is configured to receive an execution instruction of a copy function input by a user operation of the operation unit 3. The copy function is a function of causing the document reading unit 5 to read a document set on the document platen 52 or a document fed by the document feeding unit 6, and executing a printing process using image data acquired by the document reading unit 5. In the present disclosure, the printing process indicates a process of forming an image on a sheet by the image forming unit 4.

The execution instruction of a copy function includes a printing condition. The printing condition includes a designation of a sheet size, an instruction of reducing or enlarging an image to be formed, an instruction of adjusting the density of an image to be formed, and an execution instruction of an aggregate printing process to be described later.

The printing process unit 12 executes a printing process, based on a printing condition included in an execution instruction of a copy function, which is received by the print instruction receiving unit 11. Specifically, the printing process unit 12 applies an edit process such as an enlargement/reduction process or a density adjustment process with respect to image data acquired by the document reading unit 5, based on a printing condition. The printing process unit 12 causes the image forming unit 4 to form an image represented by image data which has undergone the edit process, on a sheet of a size designated as the printing condition.

Further, in the case where the printing condition includes an execution instruction of an aggregate printing process, the printing process unit 12 executes the aggregate printing process. The aggregate printing process is a process of aggregating images represented by image data acquired by the document reading unit 5 and causing the image forming unit 4 to form the aggregated images on one of sheets. Hereinafter, the number of sheets of images to be aggregated on one of sheets by the aggregate printing process is called as "the aggregate sheet number".

A plurality of candidate aggregate sheet numbers are set in advance, as candidates of the aggregate sheet number usable in executing the aggregate printing process by the printing process unit 12. The candidate aggregate sheet numbers are stored in the non-volatile memory. In the following, description is made based on the premise that three candidate aggregate sheet numbers "2", "4", and "8" are set in advance. In this case, the printing process unit 12 is capable of executing the aggregate printing process of aggregating images to be formed by a printing process on one of sheets, every two sheets, every four sheets, or every eight sheets. In other words, the printing process unit 12 is capable of executing the aggregate printing process known as page layouts of 2in1 (two-in-one), 4in1 (four-in-one), or 8in1 (eight-in-one).

The print controlling unit 13 controls execution of a copy function, whose execution instruction is received by the print instruction receiving unit 11. The details of the print controlling unit 13 will be described later in detail.

The size extracting unit 14 is configured to extract the sizes of characters included in an image represented by image data acquired by the document reading unit 5 by executing a well-known character recognition process such as OCR (Optical Character Recognition).

In the following, an execution control operation of a copy function to be performed by the control unit 10 is described referring to FIG. 3 to FIG. 12. In the following description, the details of the print controlling unit 13, the size receiving unit 15, the size judgment unit 16, the aggregate sheet number determination unit 17, the size input guiding unit 18, the sheet number detection unit 19, the sheet number receiving unit 20, the sheet number judgment unit 21, and the selection instruction receiving unit 22 are described.

First of all, an operation of inputting an execution instruction of a copy function is described. In response to a user operation of pressing a hard key provided in the operation key unit 32 for switching the operation function to the copy function, the control unit 10 causes the display unit 31 to display an operation screen of the copy function. On the operation screen of the copy function, there are provided operation buttons for allowing the user to set a printing condition to be used in a printing process in executing the copy function.

Figure 3:
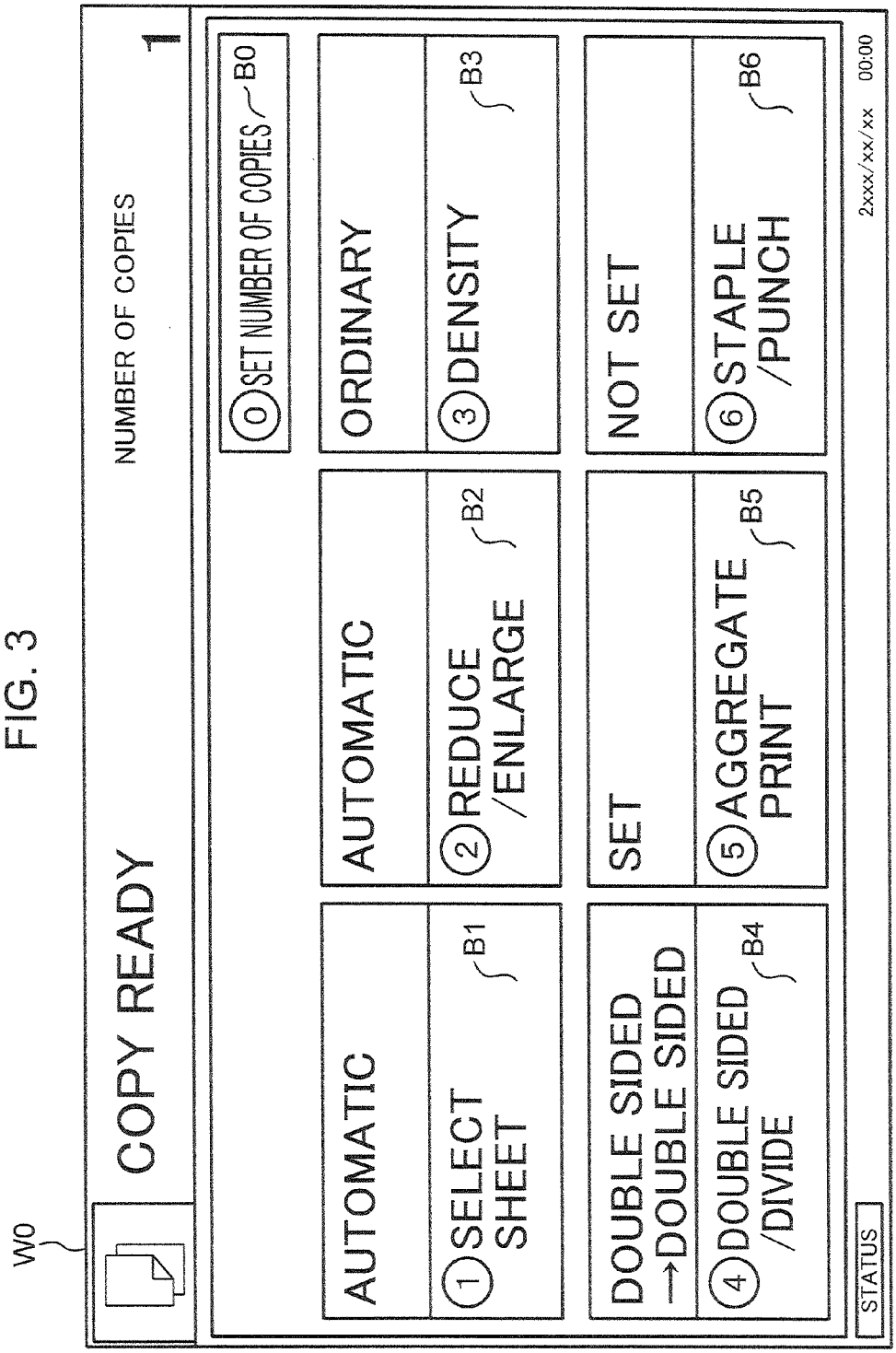
FIG. 3 is an explanatory diagram illustrating an example of an operation screen of a copy function.

FIG. 3 is an explanatory diagram illustrating an example of an operation screen W0 of the copy function. As illustrated in FIG. 3, on the operation screen W0 of the copy function, there are provided, as operation buttons for allowing the user to set a printing condition, a copy number setting button B0, a sheet selection setting button B1, a reduction/enlargement setting button B2, a density setting button B3, a double sided/division setting button B4, an aggregate print setting button B5, and a staple/punch setting button B6.

In the following, the aggregate print setting button B5 as an example of the operations buttons is described. The aggregate print setting button B5 is an operation button with which the user is allowed to set whether an execution instruction of the aggregate printing process is included in the printing condition. In response to a user operation of touching the aggregate print setting button B5, the control unit 10 causes the display unit 31 to display a soft key indicating "SET", and a soft key indicating "NOT SET" in an overlapping manner on the operation screen. Subsequently, in response to a user operation of touching one of the soft keys, the control unit 10 causes the display unit 31 to display the contents indicating the touched soft key on an upper portion of the aggregate print setting button B5 in the vertical direction of the display unit 31. For instance, FIG. 3 illustrates an example, in which the user touches the soft key indicating "SET", after having touched the aggregate print setting button B5. In other words, FIG. 3 illustrates an example, in which the indication "SET" as the contents of the touched soft key is displayed on the upper portion of the aggregate print setting button B5. As described above, in the case where the user touches the aggregate print setting button B5, and touches the soft key indicating "SET", an execution instruction of the aggregate printing process is included in the printing condition. On the other hand, in the case where the user touches the soft key indicating "NOT SET", an execution instruction of the aggregate printing process is not included in the printing condition. It should be noted that the printing condition setting method is not limited to the above.

After each of the printing conditions is set using the operation screen of the copy function, in response to a user operation of pressing the start key provided in the operation key unit 32, an execution instruction of the copy function is input.

Figure 4:
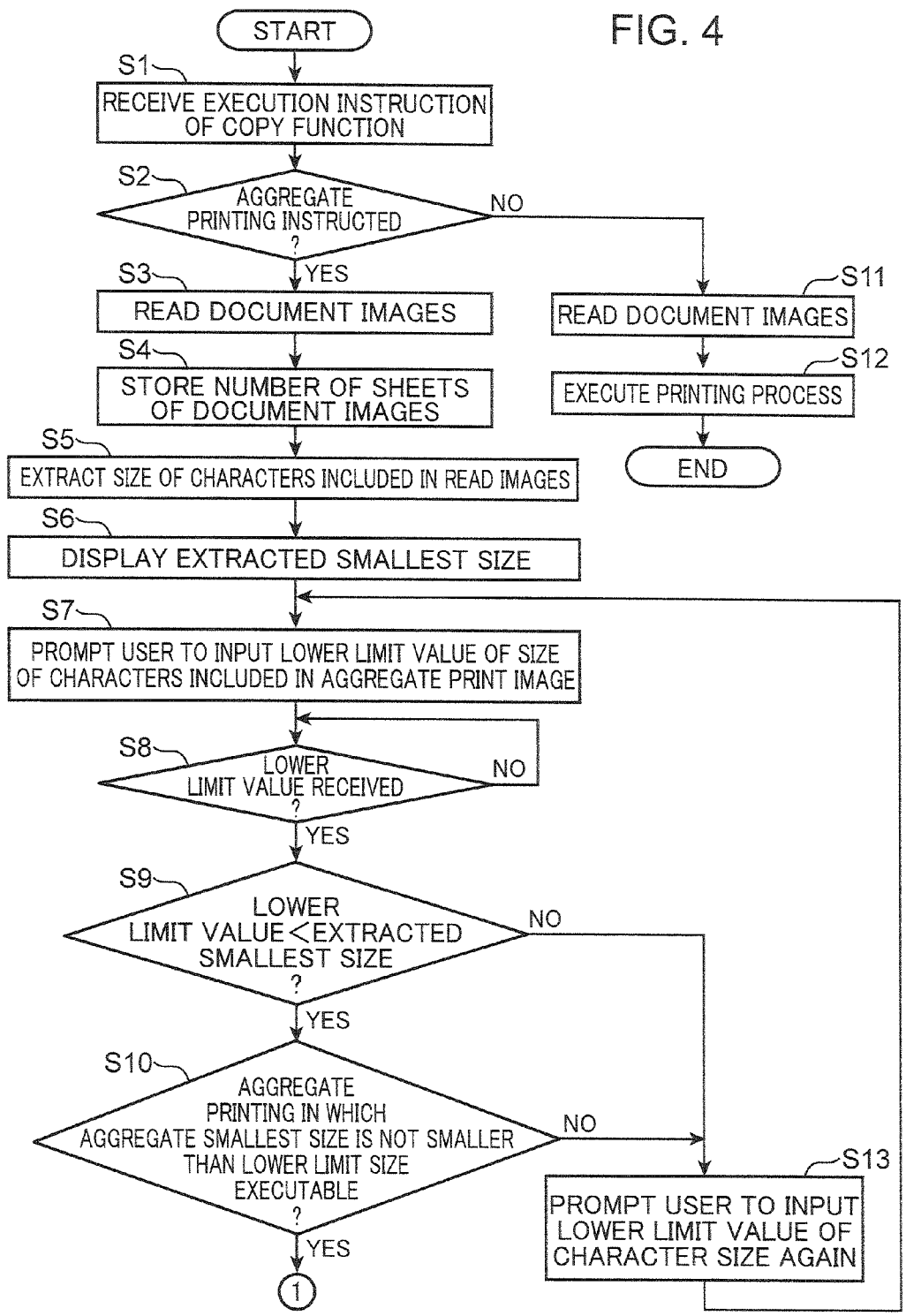
FIG. 4 is a flowchart illustrating a first half of an operation to be performed when the copy function is executed.
Figure 5:
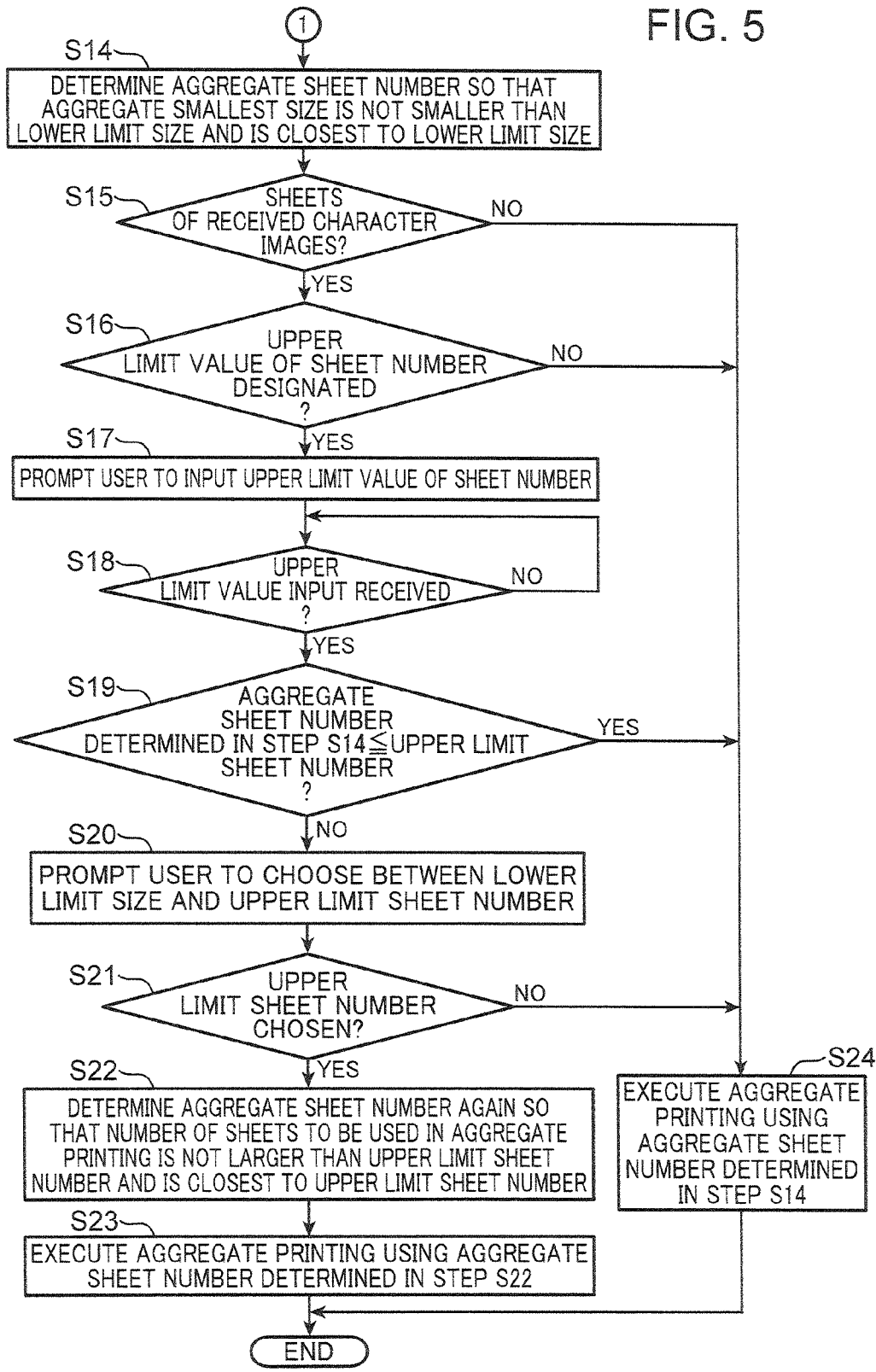
FIG. 5 is a flowchart illustrating a second half of the operation to be performed when the copy function is executed.

FIG. 4 and FIG. 5 are a flowchart illustrating an operation to be performed when the copy function is executed. As illustrated in FIG. 4, in response to input of an execution instruction of the copy function, the print instruction receiving unit 11 receives an execution instruction of the copy function including a printing condition set by an operation on the operation screen W0 (see FIG. 3) (in Step S1). Hereinafter, "a printing condition to be included in an execution instruction of the copy function received by the print instruction receiving unit 11" is simply called as a "printing condition".

In the case where an execution instruction of the aggregate printing process is not included in the printing condition (NO in Step S2), the print controlling unit 13 causes the document reading unit 5 to read an image of a document set on the document platen 52 or an image of a document fed by the document feeding unit 6. Then, image data representing an image to be formed on a sheet by a printing process is received by the document reading unit 5. Subsequently, the print controlling unit 13 causes the RAM to store the image data read by the document reading unit 5 (in Step S11). Subsequently, the print controlling unit 13 causes the printing process unit 12 to execute a printing process based on the printing condition (in Step S12).

On the other hand, in the case where an execution instruction of the aggregate printing process is included in the printing condition (YES in Step S2), similarly to Step S11, the print controlling unit 13 causes the document reading unit 5 to read an image of a document set on the document platen 52 or an image of a document fed by the document feeding unit 6. Then, image data representing an image to be formed on a sheet by a printing process is received by the document reading unit 5. Subsequently, the print controlling unit 13 causes the RAM to store the image data read by the document reading unit 5 (in Step S3).

Subsequently, the sheet number detection unit 19 counts the number of sheets of images represented by the image data read by the document reading unit 5. Then, the sheet number detection unit 19 causes the RAM to store the counted number of sheets of images (in Step S4).

Subsequently, the size extracting unit 14 extracts the sizes of characters included in the image represented by the image data read by the document reading unit 5 by executing a well-known character recognition process such as OCR (in Step S5). Hereinafter, an image represented by image data read by the document reading unit 5 is called as a "received character image".

Subsequently, the print controlling unit 13 causes the display unit 31 to display a smallest size of characters, out of the sizes of characters extracted by the size extracting unit 14 (in Step S6). Hereinafter, the smallest size of characters out of the sizes of characters extracted by the size extracting unit 14 is called as an "extracted smallest size".

Subsequently, the size input guiding unit 18 prompts the user to input the lower limit value of the size of characters included in the image to be formed on a sheet by the aggregate printing process (in Step S7). Hereinafter, an image to be formed on a sheet by the aggregate printing process is called as an "aggregate print image".

Figure 6:
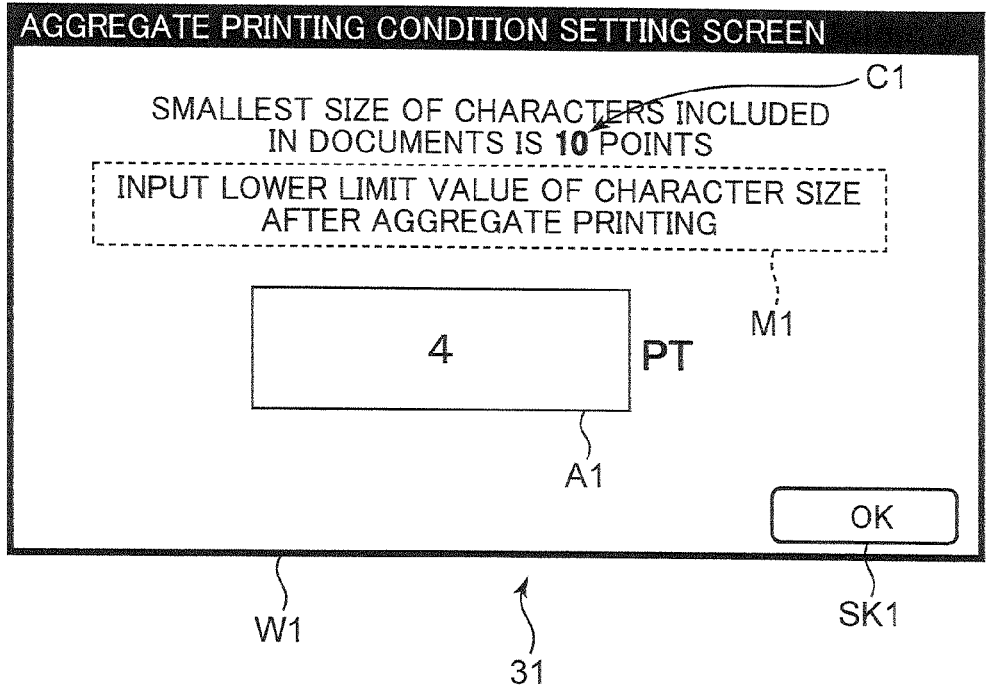
FIG. 6 is an explanatory diagram illustrating an example of an operation screen on which the user is allowed to perform an operation of inputting a lower limit value of the size of characters included in an aggregate print image.

FIG. 6 is an explanatory diagram illustrating an example of an operation screen W1 on which the user is allowed to perform an operation of inputting a lower limit value of the size of characters included in an aggregate print image. Specifically, as illustrated in FIG. 6, for instance, in Step S6, the print controlling unit 13 causes the display unit 31 to display the operation screen W1 including an extracted smallest size C1 ("10 POINTS" in FIG. 6). Subsequently, in Step S7, the size input guiding unit 18 causes the display unit 31 to display, within the operation screen W1, a message M1 of prompting the user to input a lower limit value of the size of characters included in the aggregate print image, and an input area A1 of the lower limit value. Thus, the size input guiding unit 18 prompts the user to input the lower limit value of the size of characters included in the aggregate print image.

In this case, let it be assumed that after the lower limit value of the size of characters included in the aggregate print image is input in the input area A1 displayed on the operation screen W1 by a user operation of the numeric keypad provided in the operation key unit 32, the user touches a soft key SK1 provided in the operation screen W1. Then, the size receiving unit 15 receives the lower limit value of the size of characters included in the aggregate print image, which is input through the input area A1. Hereinafter, the lower limit value of the size of characters included in an aggregate print image received by the size receiving unit 15 is called as a "lower limit size".

In the case where the lower limit value of the size of characters included in the aggregate print image is received by the size receiving unit 15 (YES in Step S8), the size judgment unit 16 judges whether the lower limit size is smaller than the extracted smallest size (in Step S9).

When the aggregate printing process is executed, received character images are aggregated and formed on one of sheets. Accordingly, the characters with a size corresponding to the extracted smallest size, which are included in the received character images, are formed on a sheet with a size smaller than the size before the aggregate printing process is executed. In other words, the smallest size of characters included in the aggregate print image is smaller than the extracted smallest size.

In view of the above, in the case where the size judgment unit 16 judges that the lower limit size is not smaller than the extracted smallest size (NO in Step S9), the size judgment unit 16 judges that the aggregate printing process is inexecutable, based on a judgment that a lower limit value inappropriate for execution of the aggregate printing process is input. In this case (NO in Step S9), the size input guiding unit 18 prompts the user to input the lower limit value again (in Step S13). After Step S13, the process of Step S7 and thereafter is executed.

Figure 7:
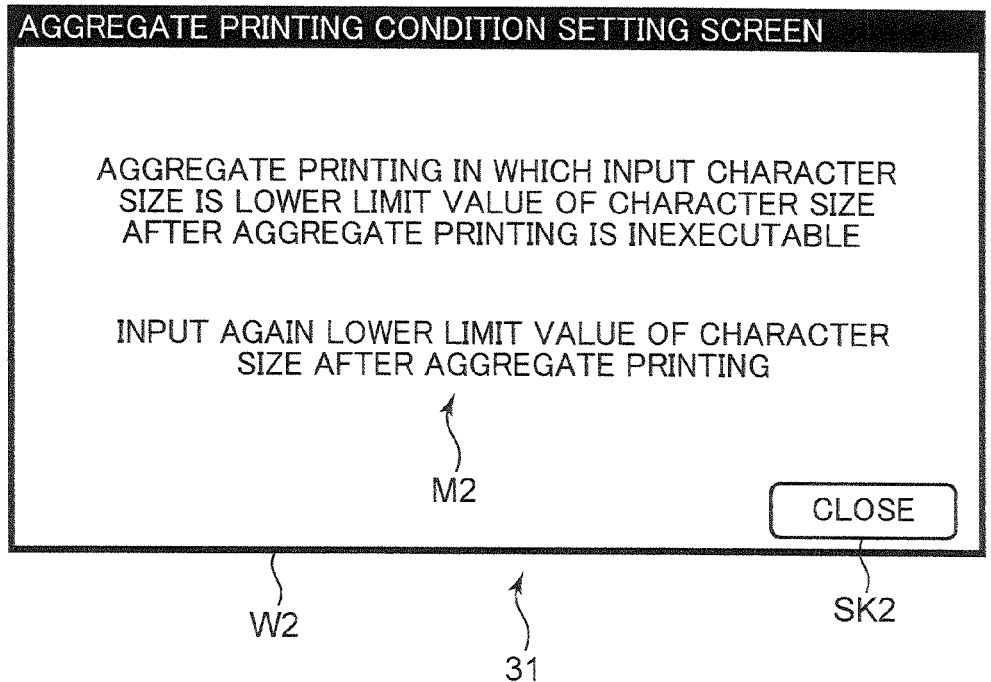
FIG. 7 is an explanatory diagram illustrating an example of an operation screen on which the user is prompted to input a lower limit value of the size of characters again.

FIG. 7 is an explanatory diagram illustrating an example of an operation screen W2 on which the user is prompted to input a lower limit value of the size of characters again. Specifically, as illustrated in FIG. 7, in step S13, the size input guiding unit 18 causes the display unit 31 to display the operation screen W2. The operation screen W2 includes a message M2 of prompting the user to input a lower limit value of the size of characters included in the aggregate print image again. In response to a user operation of touching a soft key SK2 provided in the operation screen W2, the size input guiding unit 18 causes the display unit 31 to finish display of the operation screen W2. Thereafter, the process of Step S7 and thereafter is executed again.

On the other hand, in Step S9, in the case where the size judgment unit 16 judges that the lower limit size is smaller than the extracted smallest size (YES in Step S9), the size judgment unit 16 judges whether the aggregate printing process is executable in such a manner that the smallest size of characters included in the aggregate print image is not smaller than the lower limit size (in Step S10). Hereinafter, the smallest size of characters to be included in the aggregate print image is called as an "aggregate smallest size".

Figures 8, 9:
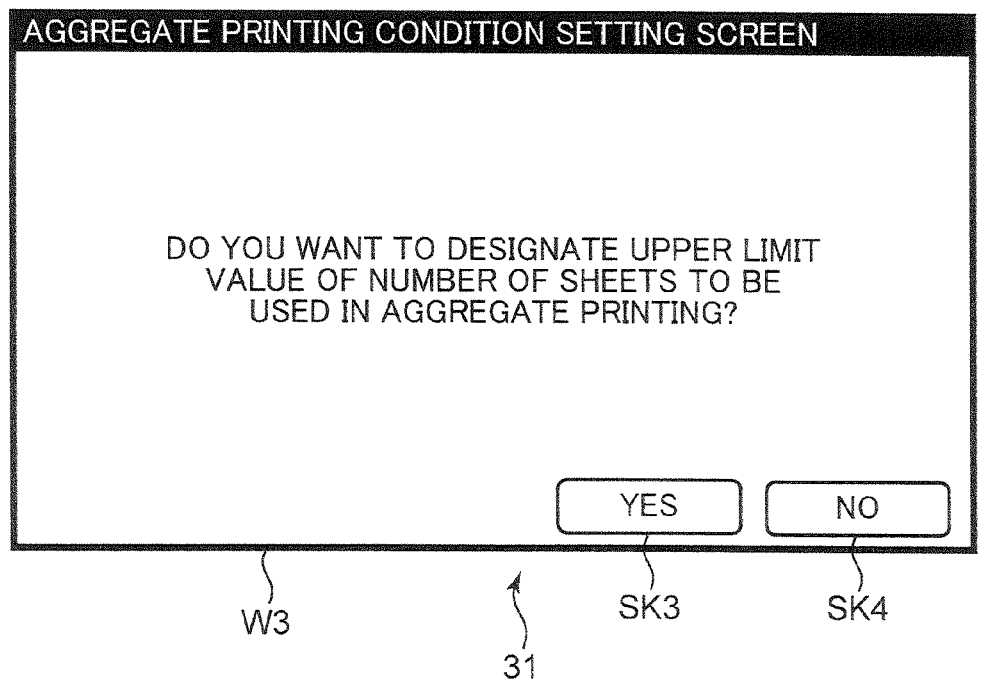
FIG. 8 is an explanatory diagram of a judging process to be executed by a size judgment unit, and an aggregate sheet number determination process to be executed by an aggregate sheet number determination unit.
FIG. 9 is an explanatory diagram illustrating an example of an operation screen on which the user is allowed to perform a selection operation as to whether an upper limit value of the number of sheets to be used in an aggregate printing process is designated.

In the following, a judging process to be executed by the size judgment unit 16 in Step S10 is described referring to FIG. 8. FIG. 8 is an explanatory diagram of the judging process to be executed by the size judgment unit 16, and an aggregate sheet number determination process to be executed by the aggregate sheet number determination unit 17 to be described later. FIG. 8 illustrates reduction ratios of a received character image when an aggregate printing process is executed using three candidate aggregate sheet numbers ("2", "4", "8") as the aggregate sheet number, in the case where the sheet size is "A4" and the size of the received character image is "A4".

For instance, let it be assumed that an aggregate printing process is executed, in which the candidate aggregate sheet number "2" is used as the aggregate sheet number, and two received character images are aggregated on one of sheets. In this case, the received character images are reduced with a reduction ratio of 71%. Further, let it be assumed that an aggregate printing process is executed, in which the candidate aggregate sheet number "4" is used as the aggregate sheet number, and four received character images are aggregated on one of sheets. In this case, the received character images are reduced with a reduction ratio of 50%. Further, let it be assumed that an aggregate printing process is executed, in which the candidate aggregate sheet number "8" is used as the aggregate sheet number, and eight received character images are aggregated on one of sheets. In this case, the received character images are reduced with a reduction ratio of 35%.

For instance, let it be assumed that the extracted smallest size is "10 POINTS", and the lower limit size is "4 POINTS". If the aggregate printing process using the aggregate sheet number "2" is executed in the above condition, the characters with the extracted smallest size "10 POINTS" to be included in the received character images are reduced with a reduction ratio of 71%. As a result of the size reduction, the aggregate smallest size is "7 POINTS", which is not smaller than the lower limit size. Accordingly, in Step S10, the size judgment unit 16 judges that the aggregate printing process is executable in such a manner that the aggregate smallest size is not smaller than the lower limit size.

If the aggregate printing process using the aggregate sheet number "4" is executed in the above condition, the characters with the extracted smallest size "10 POINTS" to be included in the received character images are reduced with a reduction ratio of 50%. As a result of the size reduction, the aggregate smallest size is "5 POINTS", which is not smaller than the lower limit size. Accordingly, in Step S10, the size judgment unit 16 may judge that the aggregate printing process is executable in such a manner that the aggregate smallest size is not smaller than the lower limit size.

On the other hand, let it be assumed that the extracted smallest size is "10 POINTS", and the lower limit size is "8 POINTS". In this case, no matter what aggregate printing process using the aggregate sheet number "2", "4", or "8" may be executed, the aggregate smallest size is smaller than the lower limit size "8 POINTS". Accordingly, in this case, in Step S10, the size judgment unit 16 judges that the aggregate printing process is inexecutable in such a manner that the aggregate smallest size is not smaller than the lower limit size.

Referring back to FIG. 4, in Step S10, in the case where the size judgment unit 16 judges that the aggregate printing process is inexecutable in such a manner that the aggregate smallest size is not smaller than the lower limit size (NO in Step S10), the size judgment unit 16 judges that the aggregate printing process is inexecutable, based on a judgment that a lower limit value inappropriate for execution of the aggregate printing process is input. In this case (NO in Step S10), the size input guiding unit 18 prompts the user to input the lower limit value again (in Step S13).

On the other hand, in Step S10, in the case where the size judgment unit 16 judges that the aggregate printing process is executable in such a manner that the aggregate smallest size is not smaller than the lower limit size (YES in Step S10), the size judgment unit 16 judges that the aggregate printing process is executable, based on a judgment that a lower limit value appropriate for execution of the aggregate printing process is input. In this case (YES in Step S10), as illustrated in FIG. 5, the aggregate sheet number determination unit 17 determines the aggregate sheet number in such a manner that the aggregate smallest size is not smaller than the lower limit value and is closest to the lower limit value (in Step S14).

Specifically, let it be assumed that the extracted smallest size is "10 POINTS", and the lower limit size is "4 POINTS". As illustrated in FIG. 8, if the aggregate printing process is executed using the candidate aggregate sheet number "2" as the aggregate sheet number in the above condition, the aggregate smallest size is "7 POINTS". Further, if the aggregate printing process is executed using the candidate aggregate sheet number "4" as the aggregate sheet number, the aggregate smallest size is "5 POINTS". Accordingly, in Step S14, the aggregate sheet number determination unit 17 determines the candidate aggregate sheet number "4" to be used in the aggregate printing process that makes the aggregate smallest size to be equal to "5 POINTS", as the aggregate sheet number, so that the aggregate smallest size is not smaller than the lower limit size "4 POINTS" and is closest to the lower limit size "4 POINTS".

Subsequently, in the case where the number of sheets of received character images stored in the RAM by the sheet number detection unit 19 in Step S4 is one (NO in Step S15), the print controlling unit 13 causes the printing process unit 12 to execute the aggregate printing process using the aggregate sheet number determined by the aggregate sheet number determination unit 17 in Step S14 (in Step S24).

On the other hand, in the case where the number of sheets of received character images stored in the RAM by the sheet number detection unit 19 in Step S4 is two or more (YES in Step S15), the print controlling unit 13 prompts the user to perform a selection operation as to whether the upper limit value of the number of sheets to be used in the aggregate printing process is designated.

FIG. 9 is an explanatory diagram illustrating an example of an operation screen W3 on which the user is allowed to perform a selection operation as to whether the upper limit value of the number of sheets to be used in the aggregate printing process is designated. In the case where the number of sheets of received character images stored in the RAM by the sheet number detection unit 19 in Step S4 is two or more (YES in Step S15), as illustrated in FIG. 9, for instance, the print controlling unit 13 causes the display unit 31 to display the operation screen W3.

In the case where the user touches a soft key SK4 indicating "NO" and provided in the operation screen W3, the print controlling unit 13 judges that the user has selected that the upper limit value of the number of sheets to be used in the aggregate printing process is not designated (NO in Step S16). In this case, the print controlling unit 13 causes the printing process unit 12 to execute the aggregate printing process using the aggregate sheet number determined by the aggregate sheet number determination unit 17 in Step S14 (in Step S24).

On the other hand, in the case where the user touches a soft key SK3 indicating "YES" and provided in the operation screen W3, the print controlling unit 13 judges that the user has selected that the upper limit value of the number of sheets to be used in the aggregate printing process is designated (YES in Step S16). In this case, the sheet number receiving unit 20 prompts the user to input the upper limit value of the number of sheets to be used in the aggregate printing process (in Step S17).

Figures 10, 11:
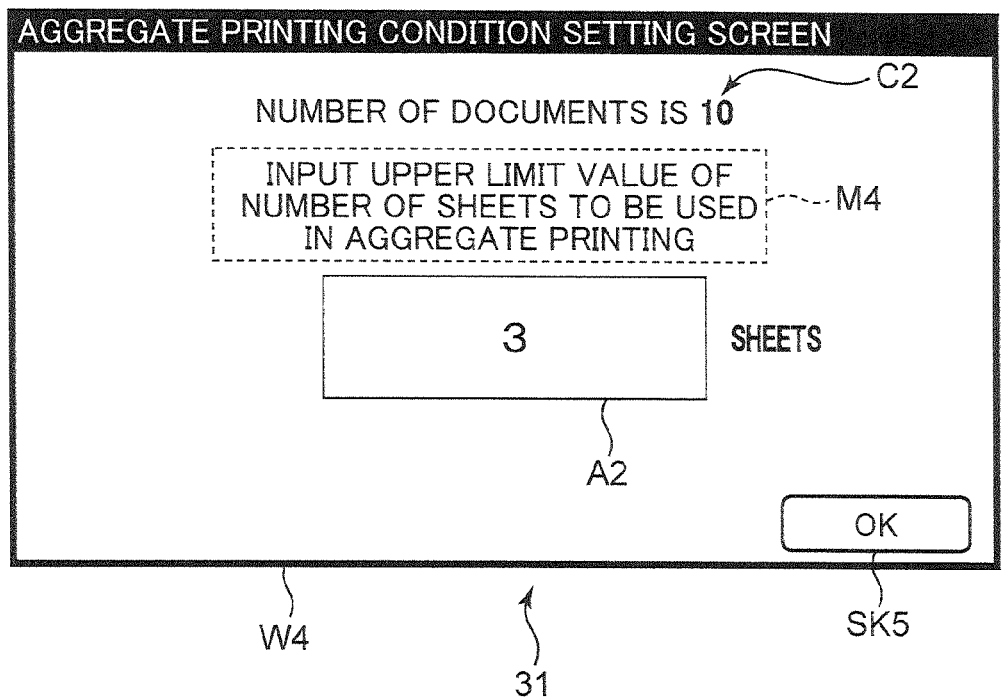
FIG. 10 is an explanatory diagram illustrating an example of an operation screen on which the user is allowed to perform an operation of inputting an upper limit value of the number of sheets to be used in the aggregate printing process.
FIG. 11 is an explanatory diagram of a judging process to be executed by a sheet number judgment unit.

FIG. 10 is an explanatory diagram illustrating an example of an operation screen W4 on which the user is allowed to perform an operation of inputting the upper limit value of the number of sheets to be used in the aggregate printing process. As illustrated in FIG. 10, for instance, in Step S17, the sheet number receiving unit 20 causes the display unit 31 to display the operation screen W4. The operation screen W4 includes the number C2 ("10" in FIG. 10) of sheets of received character images stored in the RAM, a message M4 of prompting the user to input an upper limit value of the number of sheets to be used in the aggregate printing process, and an input area A2 of the upper limit value. With this configuration, the sheet number receiving unit 20 prompts the user to input an upper limit value of the number of sheets to be used in the aggregate printing process.

Let it be assumed that an upper limit value of the number of sheets to be used in the aggregate printing process is input in the input area A2 displayed on the operation screen W4 by a user operation of operating the numeric keypad provided in the operation key unit 32, for instance. Thereafter, in response to a user operation of touching the soft key SK5 provided in the operation screen W4, the sheet number receiving unit 20 receives the upper limit value input in the input area A2.

Referring back to FIG. 5, let it be assumed that the upper limit value of the number of sheets to be used in the aggregate printing process is received by the sheet number receiving unit 20 (YES in Step S18). Hereinafter, the upper limit value of the number of sheets to be used in the aggregate printing process, which is received by the sheet number receiving unit 20 is called as "the upper limit sheet number". In this case, the sheet number judgment unit 21 judges whether the number of sheets to be used in the aggregate printing process using the aggregate sheet number determined in Step S14 is not larger than the upper limit sheet number (in Step S19).

In the following, the judging process in Step S19 to be executed by the sheet number judgment unit 21 is described referring to FIG. 11. FIG. 11 is an explanatory diagram of the judging process to be executed by the sheet number judgment unit 21. For instance, let it be assumed that the aggregate sheet number determined in Step S14 is "4", the number of sheets of received character images stored in the RAM is "10", and the upper limit sheet number is "3". In this case, as illustrated in FIG. 11, the number of sheets to be used in the aggregate printing process using the aggregate sheet number "4" is "3", which is equal to the upper limit sheet number. Accordingly, the sheet number judgment unit 21 judges that the number of sheets to be used in the aggregate printing process using the aggregate sheet number determined in Step S14 is not larger than the upper limit sheet number.

On the other hand, let it be assumed that the aggregate sheet number determined in Step S14 is "4", the number of sheets of received character images stored in the RAM is "10", and the upper limit sheet number is "2". In this case, the number of sheets to be used in the aggregate printing process using the aggregate sheet number "4" is "3", which is larger than the upper limit sheet number. Accordingly, the sheet number judgment unit 21 judges that the number of sheets to be used in the aggregate printing process using the aggregate sheet number determined in Step S14 is larger than the upper limit sheet number.

Referring back to FIG. 5, in Step S19, in the case where the sheet number judgment unit 21 judges that the number of sheets to be used in the aggregate printing process using the aggregate sheet number determined in Step S14 is not larger than the upper limit sheet number (YES in Step S19), the sheet number judgment unit 21 judges that the aggregate printing process is executable by using the aggregate sheet number determined in Step S14. In this case, the print controlling unit 13 causes the print processing unit 12 to execute the aggregate printing process using the aggregate sheet number determined in Step S14 (in Step S24).

On the other hand, in Step S19, in the case where the sheet number judgment unit 21 judges that the number of sheets to be used in the aggregate printing process using the aggregate sheet number determined in Step S14 is larger than the upper limit sheet number (NO in Step S19), the sheet number judgment unit 21 judges that the aggregate printing process using the aggregate sheet number determined in Step S14 is inexecutable. In this case, the selection instruction receiving unit 22 prompts the user to select priority between the lower limit size and the upper limit sheet number (in Step S20).

Figure 12:
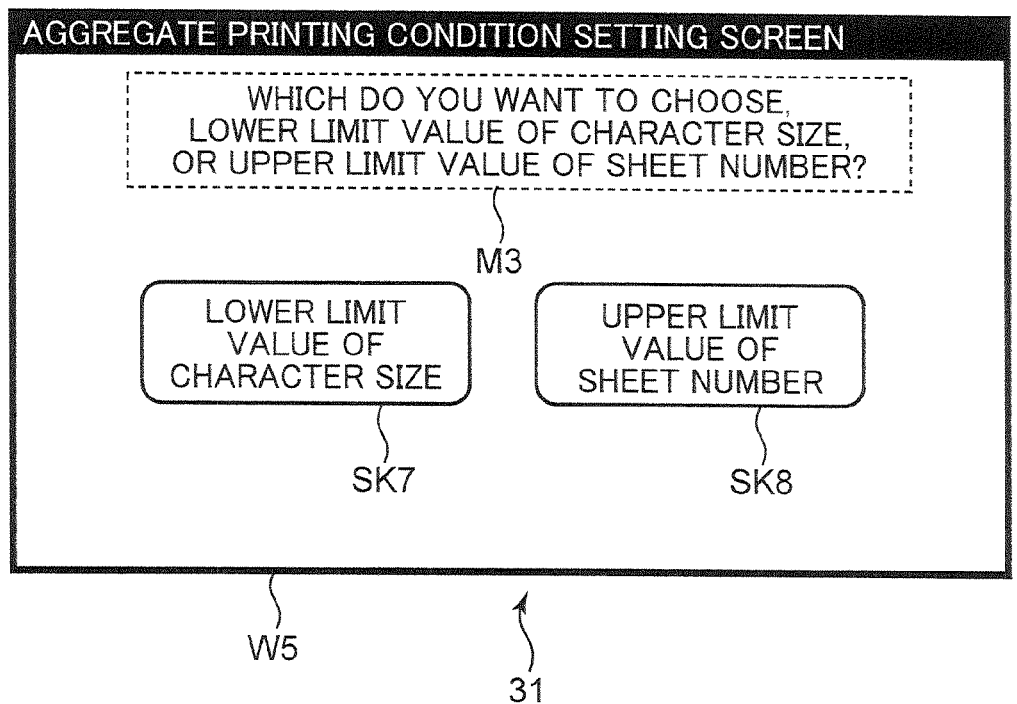
FIG. 12 is an explanatory diagram illustrating an example of an operation screen on which the user is allowed to perform a selection operation of selecting between an instruction to prioritize a lower limit size and an instruction to prioritize an upper limit sheet number.

FIG. 12 is an explanatory diagram illustrating an example of an operation screen W5 on which the user is allowed to perform a selection operation of selecting between an instruction to prioritize the lower limit size and an instruction to prioritize the upper limit sheet number. Specifically, as illustrated in FIG. 12, for instance, in Step S20, the selection instruction receiving unit 22 causes the display unit 31 to display the operation screen W5. The operation screen W5 includes a message M3 of prompting the user to select priority between the lower limit size and the upper limit sheet number, a soft key SK7 with which the user is allowed to input an instruction to prioritize the lower limit size, and a soft key SK8 with which the user is allowed to input an instruction to prioritize the upper limit sheet number. With this configuration, the selection instruction receiving unit 22 prompts the user to select priority between the lower limit size and the upper limit sheet number.

In response to a user operation of touching the soft key SK7 provided in the operation screen W5, the selection instruction receiving unit 22 receives an instruction to prioritize the lower limit size. In this case (NO in Step S21), the print controlling unit 13 causes the printing process unit 12 to execute the aggregate printing process using the aggregate sheet number determined in Step S14 (in Step S24).

On the other hand, in response to a user operation of touching the soft key SK8 provided in the operation screen W5, the selection instruction receiving unit 22 receives an instruction to prioritize the upper limit sheet number. In this case (YES in Step S21), the aggregate sheet number determination unit 17 determines the aggregate sheet number again in such a manner that the number of sheets to be used in the aggregate printing process is not larger than the upper limit sheet number and is closest to the upper limit sheet number (in Step S22).

Specifically, as illustrated in FIG. 11, for instance, let it be assumed that the aggregate sheet number determined in Step S14 is "4", the number of sheets of received character images stored in the RAM is "10", and the upper limit sheet number is "2". In this case, the number of sheets to be used in the aggregate printing process using the candidate aggregate sheet number "8" as the aggregate sheet number is "2", which is not larger than the upper limit sheet number "2". Accordingly, in Step S22, the aggregate sheet number determination unit 17 determines the aggregate sheet number again in such a manner that the number of sheets to be used in the aggregate printing process is not larger than the upper limit sheet number "2" and is closest to the upper limit sheet number "2", in other words, sets the candidate aggregate sheet number "8" to be used in the aggregate printing process that makes the number of sheets to be used in the aggregate printing process to be equal to "2", as the aggregate sheet number.

Another example is that the aggregate sheet number determined in Step S14 is "2", the number of sheets of received character images stored in the RAM is "10", and the upper limit sheet number is "3". In this case, the number of sheets to be used in the aggregate printing process using the candidate aggregate sheet number "4" as the aggregate sheet number is "3", which is not larger than the upper limit sheet number "3". Further, the number of sheets to be used in the aggregate printing process using the candidate aggregate sheet number "8" as the aggregate sheet number is "2", which is not larger than the upper limit sheet number "3". Accordingly, in Step S22, the aggregate sheet number determination unit 17 determines the aggregate sheet number again in such a manner that the number of sheets to be used in the aggregate printing process is not larger than the upper limit sheet number "3" and is closest to the upper limit sheet number "3", in other words, sets the candidate aggregate sheet number "4" to be used in the aggregate printing process that makes the number of sheets to be used in the aggregate printing process to be equal to "3", as the aggregate sheet number.

After the aggregate sheet number is determined again by the aggregate sheet number determination unit 17 (in Step S22), the print controlling unit 13 causes the printing process unit 12 to execute the aggregate printing process using the aggregate sheet number re-determined in Step S22 (in Step S23).

According to the embodiment, in the case where the size judgment unit 16 judges that the aggregate printing process is inexecutable (NO in Step S9 and NO in Step S10), the user is prompted to input the lower limit value of the size of characters included in the aggregate print image by the size input guiding unit 18. This makes it easy for the user to recognize that the lower limit value incapable of executing the aggregate printing process is received. Accordingly, the user can promptly input a lower limit value capable of executing the aggregate printing process.

Further, in Step S14, the aggregate sheet number determination unit 17 determines the aggregate sheet number in such a manner that the aggregate smallest size is not smaller than the lower limit size and is closest to the lower limit size. Accordingly, after the aggregate printing process is executed using the aggregate sheet number determined by the aggregate sheet number determination unit 17 in Step S14 (in Step S24), the aggregate smallest size is not smaller than the lower limit size and is close to the lower limit size. Thus, the user can obtain the printed sheets outputted by an aggregate printing process, as intended by the user.

Further, in Step S19, in the case where the sheet number judgment unit 21 judges that the number of sheets to be used in the aggregate printing process using the aggregate sheet number determined in Step S14 is not larger than the upper limit sheet number (YES in Step S19), the aggregate printing process using the aggregate sheet number determined in Step S14 is executed. This makes it possible to make the number of sheets to be used in the aggregate printing process to be not larger than the upper limit sheet number. Thus, the above configuration is advantageous in avoiding execution of an aggregate printing process of using sheets of the number over the upper limit sheet number, which is not intended by the user.

Further, in Step S19, let it be assumed that the selection instruction receiving unit 22 receives an instruction to prioritize the upper limit sheet number, even in the case where the sheet number judgment unit 21 judges that the aggregate printing process is inexecutable (NO in Step S19). In this case, in Step S22, the aggregate sheet number determination unit 17 determines the aggregate sheet number again in such a manner that the number of sheets to be used in the aggregate printing process is not larger than the upper limit sheet number and is closest to the upper limit sheet number. Accordingly, after the aggregate printing process using the re-determined aggregate sheet number is executed (in Step S23), the number of sheets to be used in the aggregate printing process is not larger than the upper limit sheet number and is closest to the upper limit sheet number.

The above configuration makes it possible to increase the number of sheets to be used in the aggregate printing process, as compared with a configuration, in which the aggregate sheet number is determined again in such a manner that the number of sheets to be used in the aggregate printing process is not larger than the upper limit sheet number, and is remarkably smaller than the upper limit sheet number. In other words, the above configuration makes it possible to decrease the number of sheets of images to be aggregated on one of sheets, and makes it possible to increase the size of characters to be included in the images formed on one of sheets. Accordingly, the user can appropriately obtain the printed sheets of the number under the upper limit sheet number in accordance with the user's intention to prioritize the upper limit sheet number. Further, the above configuration makes it easy for the user to visually recognize the characters formed on a sheet.

The configuration illustrated in FIG. 1 to FIG. 12 is merely an example of the embodiment of the present disclosure, and the present disclosure is not limited to the embodiment.

(1) In the embodiment, in Step S22 (see FIG. 5), the aggregate sheet number determination unit 17 determines the aggregate sheet number again in such a manner that the number of sheets to be used in the aggregate printing process is not larger than the upper limit sheet number and is closest to the upper limit sheet number. Alternatively, Step S22 may be modified as follows. Specifically, in Step S22, let it be assumed that there are a plurality of candidate aggregate sheet numbers that satisfy a condition that the number of sheets to be used in the aggregate printing process is not larger than the upper limit sheet number. In this case, the aggregate sheet number determination unit 17 may determine again, as the aggregate sheet number, one of the candidate aggregate sheet numbers e.g. a smallest number of the candidate aggregate sheet numbers or a largest number of the candidate aggregate sheet numbers in accordance with a predetermined rule.

In the above modification, in Step S23, in the case where the aggregate printing process is executed using the re-determined aggregate sheet number, the number of sheets to be used in the aggregate printing process is not larger than the upper limit sheet number. In other words, the user can appropriately obtain the printed sheets of the number under the upper limit sheet number in accordance with a user's intention to prioritize the upper limit sheet number.

(2) The selection instruction receiving unit 22 may be omitted from the control unit 10, and Steps S20 to S23 (see FIG. 5) may be skipped in accordance with the above modification for simplifying the configuration. In Step S19 (see FIG. 5), in the case where the sheet number judgment unit 21 judges that the number of sheets to be used in the aggregate printing process using the aggregate sheet number determined in Step S14 (see FIG. 5) is larger than the upper limit sheet number (NO in Step S19), the process may return to Step S17 (see FIG. 5), or Step S24 (see FIG. 5) may be executed.

(3) In the embodiment, in Step S14 (see FIG. 5), the aggregate sheet number determination unit 17 determines the aggregate sheet number in such a manner that the aggregate smallest size is not smaller than the lower limit size and is closest to the lower limit size. Alternatively, Step S14 may be modified as follows. Specifically, in Step S14, let it be assumed that there are a plurality of candidate aggregate sheet numbers that satisfy a condition that the aggregate smallest size is not smaller than the lower limit size. In this case, the aggregate sheet number determination unit 17 may determine, as the aggregate sheet number, one of the candidate aggregate sheet numbers e.g. a smallest number of the candidate aggregate sheet numbers or a largest number of the candidate aggregate sheet numbers in accordance with a predetermined rule.

(4) Step S13 (see FIG. 4) may be skipped to simplify the configuration. In the above modification, in Step S9 (see FIG. 4), in the case where the lower limit size is judged to be not smaller than the extracted smallest size (NO in Step S9), and in Step S10 (see FIG. 4), in the case where the aggregate printing process is judged to be inexecutable in such a manner that the aggregate smallest size is not smaller than the lower limit size (NO in Step S10), the print controlling unit 13 may cause the display unit 31 to display an alert message indicating that the lower limit value input in Step S8 (see FIG. 4) is inappropriate. After the alert message is displayed, execution of the copy function may be finished.

(5) The sheet number detection unit 19 and the sheet number receiving unit 20 may be omitted from the control unit 10. Further, Step S4 (see FIG. 4), and Steps S15 to S23 (see FIG. 5) may be skipped in accordance with the above modification. After execution of Step S14, Step S24 may be executed for simplifying the configuration.

In the above modification, in the case where the lower limit size is smaller than the extracted smallest size (YES in Step S9), and the aggregate printing process is executable in such a manner that the aggregate smallest size is not smaller than the lower limit size (YES in Step S10), the size judgment unit 16 may judge that the aggregate printing process is executable.

Further, after the aggregate printing process using the aggregate sheet number determined in Step S14 is executed (in Step S24), the smallest size of characters included in the aggregate print image is not smaller than the lower limit size. This makes it possible for the user to eliminate an operation of repeatedly trying an aggregate printing process and visually recognizing an aggregate print image formed on a sheet in order to check whether the smallest size of characters included in the aggregate print image is not smaller than an intended lower limit value.

Further, the aggregate printing process is not executed, in the case where the lower limit value received by the size receiving unit 15 is larger than the smallest size of characters included in the received character images. This makes it possible to reduce a possibility that the aggregate printing process is executed in a state that the user erroneously sets a lower limit value. Thus, the above configuration makes it possible to avoid a possibility that the user performs an operation for the aggregate printing process in a state that an erroneous lower limit value is set, or sheets are wasted by the aggregate printing process.

(6) Step S9 (see FIG. 4) may be skipped, and Step S10 (see FIG. 4) may be executed after a lower limit value is input in Step S8 (see FIG. 4) for simplifying the configuration.

In the above modification, in the case where the aggregate printing process is executable in such a manner that the aggregate smallest size is not smaller than the lower limit size (YES in Step S10), the size judgment unit 16 judges that the aggregate printing process is executable. Then, after the aggregate printing process using the aggregate sheet number determined in Step S14 is executed (in Step S24), the smallest size of characters included in the aggregate print image is not smaller than the lower limit size. This makes it possible to avoid a possibility that the user performs an operation of repeatedly trying the aggregate printing process and visually recognizing an aggregate print image formed on a sheet in order to check whether the smallest size of characters included in the aggregate print image is not smaller than an intended lower limit value.

Further, the present disclosure is also applicable to an image forming apparatus such as a printer and a facsimile machine, in addition to the complex machine 1.

According to the present disclosure as described above, it is possible to avoid a possibility that the user performs an operation of repeatedly trying an aggregate printing process and visually recognizing an aggregate print image formed on a sheet by the aggregate printing process in order to check whether the smallest size of characters included in the aggregate print image is not smaller than an intended lower limit value. Further, the above configuration makes it possible to avoid a possibility that the user performs an operation for the aggregate printing process in a state that an erroneous lower limit value is set, or sheets are wasted by the aggregate printing process in a state that an erroneous lower limit value is set. This makes it possible to efficiently perform aggregate printing as intended by the user.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. An image forming apparatus, comprising:
a display unit configured to display information;
an image forming unit configured to form an image on a sheet;
an image receiving unit configured to receive the image including characters;
an aggregate printing process unit configured to execute an aggregate printing process of aggregating received character images received by the image receiving unit and causing the image forming unit to form an aggregate print image on one of sheets;
a sheet number detection unit configured to detect the number of sheets having the received character images;
a size extracting unit configured to extract a size of a smallest one of characters included in the received character images;
a size input guiding unit configured to prompt a user to input a lower limit value by causing the display unit to display:
   a first operation screen including an extracted smallest size that is extracted by the size extracting unit and is the size of the smallest one of the characters,
   a first message prompting the user to input the lower limit value, and
   a first input area of the lower limit value;
a size receiving unit configured to receive the lower limit value that is input through the first input area;
a size judgment unit configured to judge that the aggregate printing process is executable, in the case where a lower limit size, being the lower limit value received by the size receiving unit, is smaller than the extracted smallest size and the case where the aggregate printing process is executable in such a manner that an aggregate smallest size is not smaller than the lower limit size, the aggregate smallest size being a size of the smallest one of characters included in the aggregate print image;
an aggregate sheet number determination unit configured to execute an aggregate sheet number determination process of determining an aggregate sheet number in such a manner that the aggregate smallest size is not smaller than the lower limit size, in the case where the size judgment unit judges that the aggregate printing process is executable, the aggregate sheet number being the number of sheets of images to be aggregated on one of sheets by the aggregate printing process;
a sheet number receiving unit configured to cause the display unit to display:
   a second operation screen including the number of sheets having the received character images detected by the sheet number detection unit,
   a second message prompting the user to input an upper limit value for the number of sheets to be used in the aggregate printing process, and a second input area of the upper limit value, the sheet number receiving unit further being configured to receive the upper limit value input in the second input area in the case where:

the size judgment unit judges that the aggregate printing process is executable, the number of sheets having the received character images detected by the sheet number detection unit is two or more, and the user has selected that the upper limit value is designated;

a sheet number judgment unit configured to judge that the aggregate printing process is executable when the number of sheets to be used in the aggregate printing process using the aggregate sheet number determined by the aggregate sheet number determination unit is not larger than an upper limit sheet number in the case where the upper limit value is received by the sheet number receiving unit, the upper limit sheet number being the upper limit value received by the sheet number receiving unit; and a selection instruction receiving unit configured to selectively receive an instruction to prioritize the lower limit size, and an instruction to prioritize the upper limit sheet number, in the case where the sheet number judgment unit judges that the aggregate printing process is inexecutable, wherein:

the aggregate printing process unit executes the aggregate printing process using the aggregate sheet number determined by the aggregate sheet number determination unit, in the case where the size judgment unit judges that: the aggregate printing process is executable, the number of sheets having received the received character images detected by the sheet number detection unit is two or more, and the user has selected that the upper limit value is not designated, the size input guiding unit prompts the user to input the lower limit value again, in the case where the size judgment unit judges that the aggregate printing process is inexecutable, the aggregate printing process unit executes the aggregate printing process using the aggregate sheet number determined by the aggregate sheet number determination unit, in the case where the sheet number judgment unit judges that the aggregate printing process is executable, the aggregate sheet number determination unit determines the aggregate sheet number again in such a manner that the number of sheets to be used in the aggregate printing process is not larger than the upper limit sheet number, in the case where the selection instruction receiving unit receives the instruction to prioritize the upper limit sheet number, and the aggregate printing process unit executes the aggregate printing process using the aggregate sheet number determined by the aggregate sheet number determination unit in the case where the selection instruction receiving unit receives the instruction to prioritize the lower limit size, and executes the aggregate printing process using the aggregate sheet number determined again by the aggregate sheet number determination unit in the case where the selection instruction receiving unit receives the instruction to prioritize the upper limit sheet number.

2. The image forming apparatus according to claim 1, wherein a plurality of candidate aggregate sheet numbers are set in advance, as candidates of the aggregate sheet number, and the aggregate sheet number determination unit determines, as the aggregate sheet number, the candidate aggregate sheet number to be used in the aggregate printing process, out of the aggregate printing processes using each of the candidate aggregate sheet numbers as the aggregate sheet number in the aggregate sheet number determination process, the aggregate printing process being such that the aggregate smallest size is not smaller than the lower limit size and is closest to the lower limit size.

3. The image forming apparatus according to claim 1, wherein a plurality of candidate aggregate sheet numbers are set in advance, as candidates of the aggregate sheet number, and the aggregate sheet number determination unit determines again, as the aggregate sheet number, the candidate aggregate sheet number to be used in the aggregate printing process, out of the aggregate printing processes using each of the candidate aggregate sheet numbers as the aggregate sheet number, in the case where the selection instruction receiving unit receives the instruction to prioritize the upper limit sheet number, the aggregate printing process being such that the number of sheets to be used in the aggregate printing process is not larger than the upper limit sheet number and is closest to the upper limit sheet number.

* * * * *